United States Patent [19]

Anizan et al.

[11] 4,095,054

[45] June 13, 1978

[54] ELECTRONIC TELEPHONE SWITCHING SYSTEM OF THE STORED PROGRAM TYPE COMPRISING TWO ACTIVE STAGES AND ONE PASSIVE STAGE

[75] Inventors: Pierre Anizan; Jean Paul Ducournau, both of Paris; Paul Gilberton, Saint-Ouen-l'Aumone; Yves Mevel, Colombes, all of France

[73] Assignee: Societe Francaise des Telephones Ericsson, Saint-Ouen-l'Aumone, France

[21] Appl. No.: 652,760

[22] Filed: Jan. 27, 1976

Related U.S. Application Data

[63] Continuation-in-part of Ser. No. 440,272, Feb. 6, 1974, abandoned.

[30] Foreign Application Priority Data

Feb. 8, 1973  France ................................. 73.04548

[51] Int. Cl.² .............................................. H04Q 3/54
[52] U.S. Cl. ................................................ 179/18 ES
[58] Field of Search ................................... 179/18 ES

[56] References Cited

U.S. PATENT DOCUMENTS

| | | | |
|---|---|---|---|
| 3,557,315 | 1/1971 | Kobus et al. | 179/18 AG |
| 3,649,767 | 3/1972 | Muroga et al. | 179/18 ES |
| 3,749,844 | 7/1973 | Dufton | 179/18 ES |
| 3,775,566 | 11/1973 | Akimaru et al. | 179/18 ES |
| 3,830,983 | 8/1974 | Eddy et al. | 179/18 ES |
| 3,909,542 | 9/1975 | Wunluck et al. | 179/18 AH |

*Primary Examiner*—Thomas W. Brown
*Attorney, Agent, or Firm*—Karl W. Flocks

[57] ABSTRACT

Improved electronic program-controlled switching system intended to be used in connection with automatic telephone switching. The system comprises a common control equipment responsible solely for information processing and comprising at least one program memory and one data memory, and individual peripheral circuits each connected to said control equipment and which are logic circuits with special-purpose wired programs connected to the requisite systems comprising line equipment, connection network, auxiliary circuits and circuits for connection to the main network. The system allows decentralizing the main functions in the peripheral equipments.

14 Claims, 7 Drawing Figures

ELECTRONIC TELEPHONE SWITCHING SYSTEM OF THE STORED PROGRAM TYPE COMPRISING TWO ACTIVE STAGES AND ONE PASSIVE STAGE

This application is a continuation-in-part of application Ser. No. 440,272 filed Feb. 6, 1974, now abandoned.

Already known are program-controlled switching systems consisting of a central memory containing observed data together with instruction sequences. The data characterize the logic elements relating to the establishment of connections between subscriber lines and circuits through a switching network which may be of the spatial type for example. The control and decision-making functions are performed in turn by the common centralized system operating on the time-sharing principle. For any given datum retrieved from the memory, relative to a connection, it is possible to execute a sequence of instructions determined by the program and then to initiate implementation of the decisions by sending commands to the dispersed elements constituted by the switching network components, the subscriber line equipments and the circuits. The common control system can then sequentially concern itself with the other connections to be established. In order to enable more and more information to be processed, known systems resort to centralized control units which operate at increasingly higher speeds and the response times of which must approach real-time operation.

Such centralized units are either special-purpose computers or computers specially programmed to perform the functions of controlling and operating telephone installations. It is to be noted that the software section of such units represents a very heavy burden from the standpoints of size, time needed to set it up, number of programmer-years needed to prepare it, and the difficulties involved in modifying the programs or expanding the operational scope of the system.

Switching systems have been disclosed in U.S. Pat. Nos. 3,649,767 - 3,557,315 - 3,749,844 - 3,775,566 and 3,830,983.

The present invention accordingly relates to an improved automatic telephone switching system, which is program-controlled and thus retains the advantages of this operating mode while at the same time increasing reliability notwithstanding reduced equipment and software costs and lower cost of maintaining such equipment and software.

An improved electronic telephone switching system according to this invention, of the recorded program type, includes a common control equipment responsible solely for information processing, comprising at least one program memory and one data memory, and individual peripheral equipments each connected to said control equipment, said peripheral equipments taking the form of logic circuits with special-purpose wired programs such as a scanner, a decision element, and activating element or a marking element, themselves connected to the requisite systems comprising line equipments, connection network, auxiliary circuits and circuits for connection to the trunk network. The peripheral equipments which have complex functions may be with registered programs, e.g. the peripheral equipment which manages the auxiliary circuits and the operators.

In accordance with further particularities of this invention:

the common control equipment consists of at least one control unit comprising the program memory and the data memory, the latter memory being connected to a plurality of interconnection circuits in turn connected to said special-purpose peripheral equipments, said control unit constituting a self-contained equipment capable of dispatching all the traffic of the telephone installation by means of the program recorded in the memory;

the common control equipment may include two indentical control units the program memories and data memories of which may be interconnected for reliability reasons;

the memories of the control units are of the slow-cycle ferrite core type;

the peripheral equipments are modularized.

Further particularities and advantages of the invention will emerge from the description which follows with reference to the accompanying non-limitative exemplary drawings in which.

Figure 1:
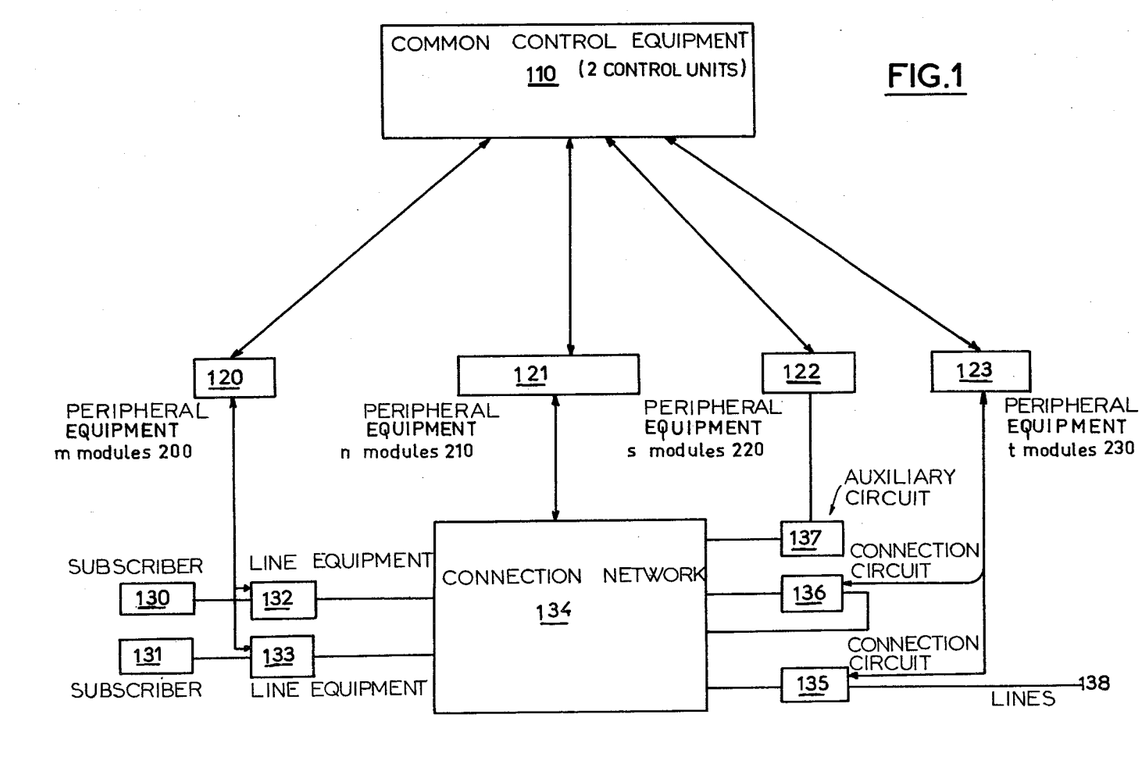
FIG. 1 is a block diagram of an electronic switching system according to the invention.

Referring first to FIG. 1, the common control equipment 110 shown thereon is the centralized decision-making system responsible for information processing. This equipment 110 may consist of two recorded-program control units operating in the traffic-sharing mode, and the special-purpose peripheral equipments 120, 121, 122 and 123 provide logic and technological interfacing between control equipment 110 and the switching network elements 132 and 133, 134, 135, 136, 137 respectively.

The blocks 132 and 133 represent the line quipments of telephone sets 130 and 131 respectively. Subscriber line equipments and extensions are controlled by the peripheral equipment 120.

The connection network 134 proper consists of switching stages with intersection point matrices, both the number of stages and the manner of constitution depending on the capacity of the telephone installation in number of lines and circuits. The connection network switches three wires, of which two are the telephone communication transmitting channels and the third for testing the availability of the interconnection lattices between the switching stages. Connection network 134 is controlled by the peripheral equipment 121.

Connection network 134 is preferably of the type hereinbefore described, that is, constituted by switching networks including switching matrices in stages which form subscriber groups and selection groups and comprise:

a conversion switching network, itself including a selection stage and a subscriber stage, connected to the arrival circuit and to the subscriber lines, and a ringing-auxiliary exploring stage connected to the voice circuits and to the auxiliary circuits.

This type of connection network was described in French Pat. No. 2,057,199.

The switching matrices may be of the rod-relay type, possibly provided upon respectively horizontal and vertical multiplexings, said relay having three working contacts associated to a diode and constituting the intersection points of three vertical lines and three horizontal lines. Such matrices were described in French Pat. No. 2,053,783.

Alternatively, such a matrix may be of the type having electromechanical microselectors enclosed in a plug-in housing having a compressible spring forming a movable contact terminal. Such microselectors may be of any convenient known type, or of the type described in French Pat. No. 2,097,426.

Peripheral equipment 123 is connected, on one hand, to the circuit 135 which allows the installation to be hooked up to the trunk telephone network via lines 138, and, on the other, to circuit 136 which allows establishing local connections between local subscribers connected to the telephone installation in question. The function of peripheral equipment 123 is to control circuits 135 and 136.

Connected to peripheral equipment 122, auxiliary circuits 137 are used temporarily for preparing to establish telephone connections. These auxiliary circuits include circuits for observing the dialling signals composed by the subscribers of telephone sets 130 or 131, the operator' circuits, the signalling code generating circuits, etc. The circuits 137 are controlled by peripheral equipment 122.

Figure 2:
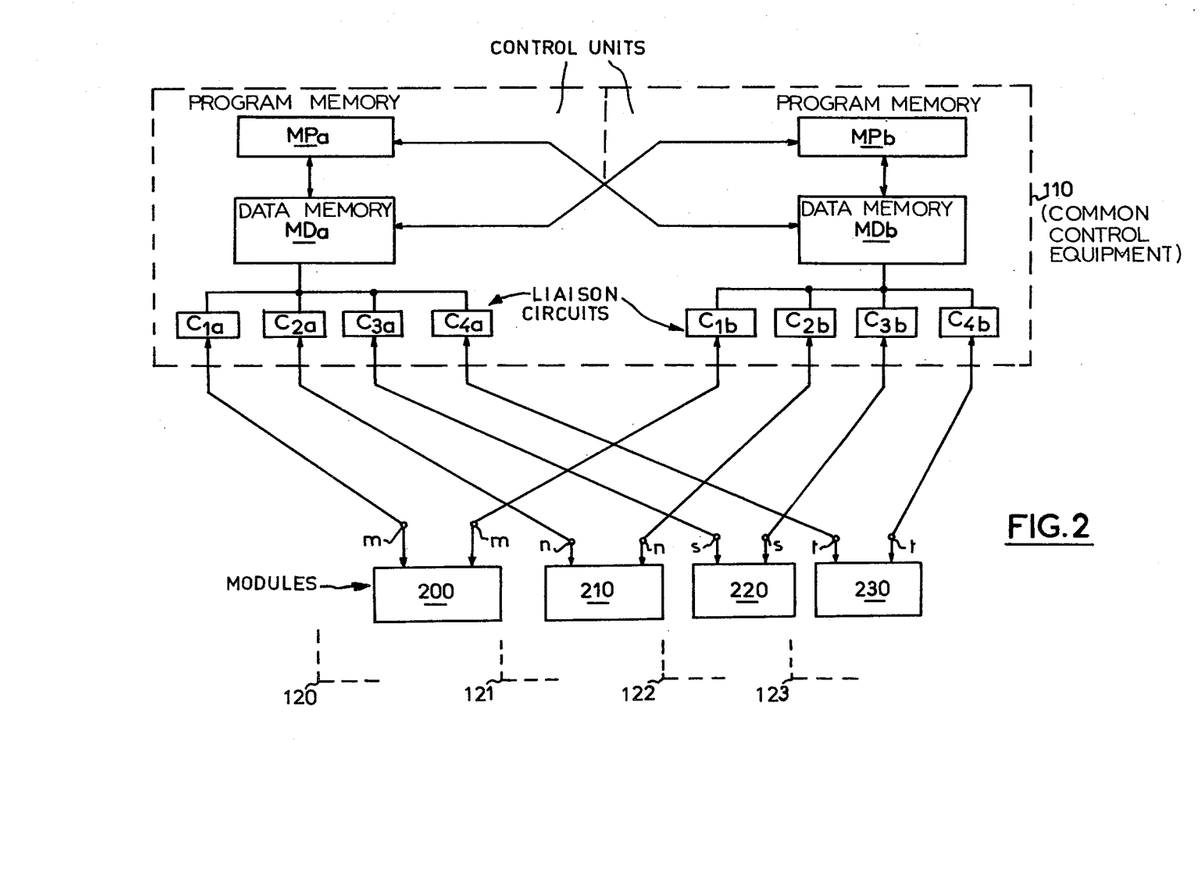
FIG. 2 is a block diagram of an embodiment of the control equipment utilizing two indentical control units connected in a traffic-sharing configuration.

FIG. 2 shows the modular arrangement of the common control equipment 110 and details the information transmitting links with each of the modular sub-units 200, 210, 220 and 230 composing the blocks 120, 121, 122 and 123, respectively, which it controls.

The commands generated by the program memory MP, then stored in the data memory MD are distributed in due course to the relevant peripheral equipments.

The different peripheral equipments 120, 121, 122, 123 are the subscriber monitoring line equipment, which manages extensions, the route tester which manages the connection network, the auxiliary scanner which manages auxiliary circuits, i.e. operator circuits and digit receivers and the junctor scanner which manages connection circuits. They consist of modulator sub-units 200, 210, 220 and 230 respectively. The respective numbers of these circuits $m$, $n$, $s$ and $t$ depend on the number of subscribers, the connection network and the number of connection circuits and auxiliary circuits in the switching system in question.

Peripheral equipments 121, 122, 123 are modular equipments and each of modules 210, 220 and 230 comprises:

a monitoring device 53 connected to connection network 134, to auxiliary circuits 137, to connection circuits 135 or 136 shown on FIG. 1; these circuits comprise bays 54;
a memory unit 51;
a main register 59;
a scanner 52;
an internal logic unit 55;
a liaison circuit register 58;
A liaison circuit logic 57;
a comparison circuit 510;
an intervention circuit 56.

Examples of circuits 51, 59, 52, 55, 57, 58, 510 are described in connection with the description of module 200.

Intervention circuit 56 is connected to bay 54, to monitoring device 53 and to the Internal Logic Unit.

The intervention circuits 56 in each of peripheral modules 210, 220, 230 allow these modules to operate respectively on connection network 134, auxiliaries circuits 137 and connection circuits such as 135 or 136. Each includes voltage generators 561 and a demultiplexer 562.

The voltage generators 561 may be of any convenient type effective in sending commands to the relays of the connection network (from equipment 121), of the auxiliaries (from equipment 122) and of the connection circuits (from equipment 123). The commands serve to establish or close contacts in the connection network, the auxiliaries and the connection circuits.

Demultiplexer 562 swiches the voltage to the components involved in these various circuits according to the auxiliary or connection-circuit matrix addresses written into scanner 52 and according to the state of the contacts monitored by device 53, encoded by coder 551 and recorded in register 552.

Since the number of contacts in the auxiliaries and the connection circuits monitored by equipments 122 and 123 may be very much greater than the number of contacts in the relays of the subscriber line equipments, the module 220 or 230 or peripheral equipments 122 and 123 respectively may, in accordance with an alternative embodiment of the invention, comprise an internal logic unit 55 having a recorded program.

In an alternative embodiment, peripheral equipment 121 is devoid of a memory, in which case, instead of reading from the memory the states of contacts along a path to be established, peripheral equipment 121 rechecks, at each computer request, the states of those contacts likely to be involved in establishing the require connection.

Figure 5A:
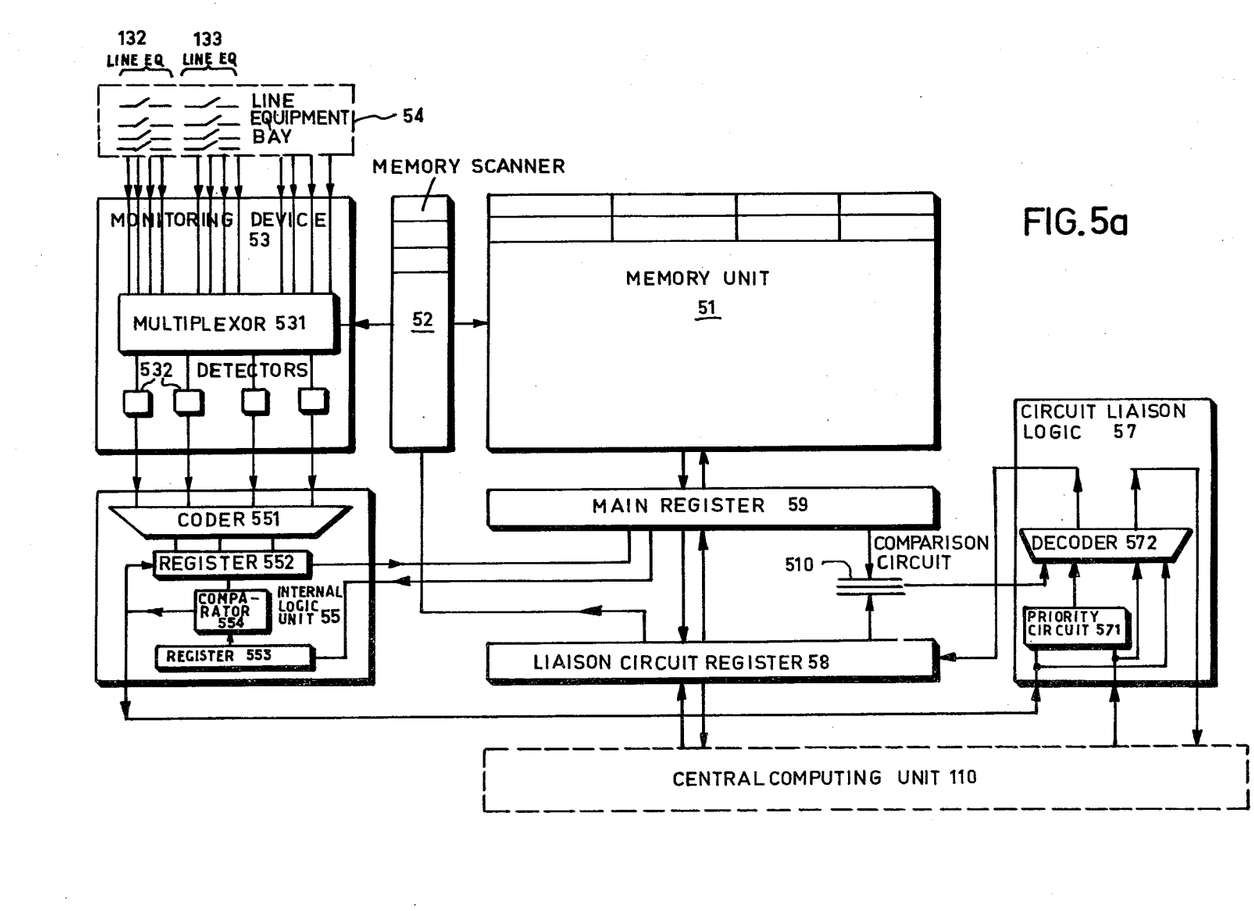
FIG. 5a and 5b are block diagrams of peripheral modules.
Figure 5B:
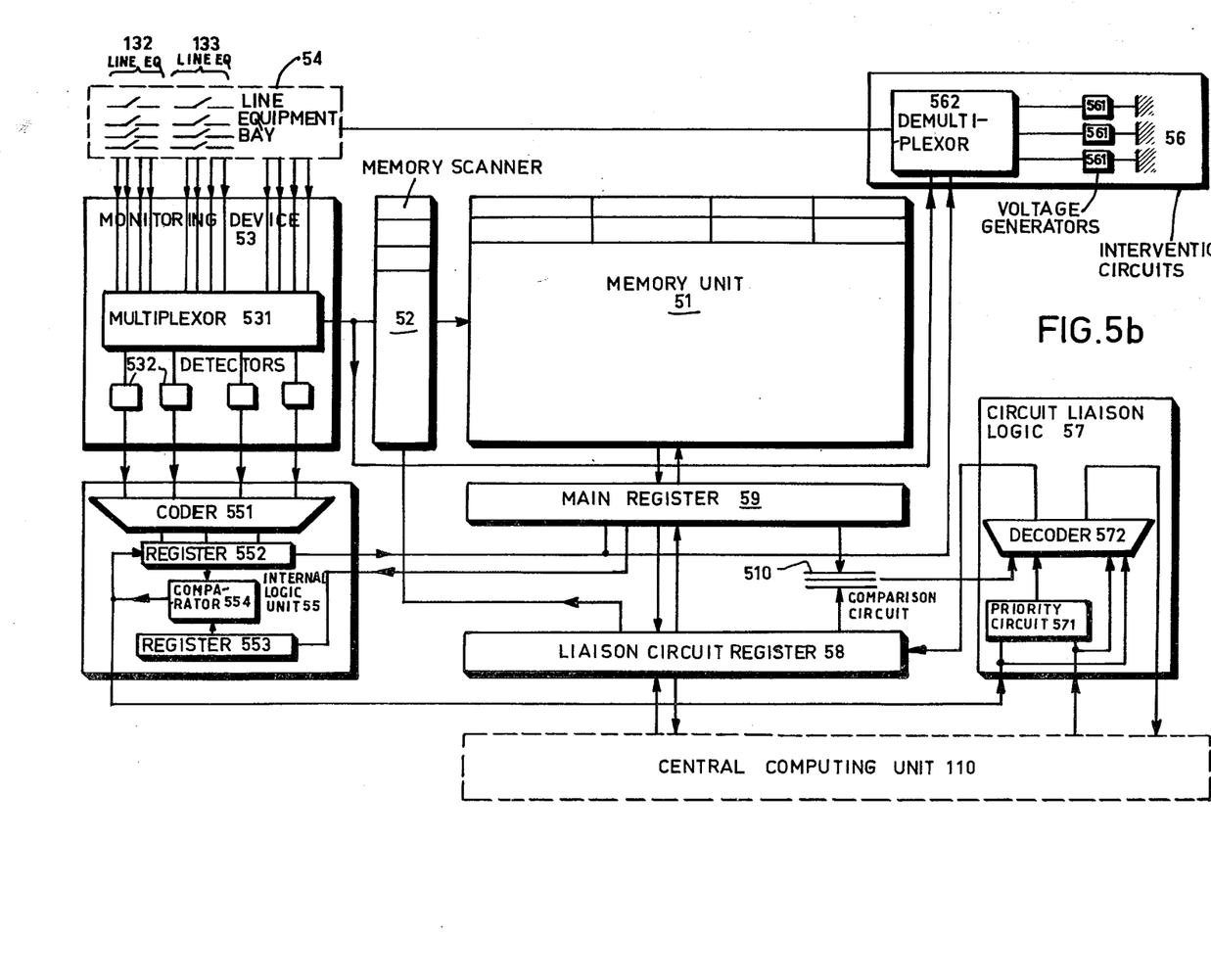

One example of the sub-units 200, 210, 220 and 230 are more detailed in comparison with the FIG. 5a and 5b.

Common control equipment 110 is formed of two identical control units, each having a data memory MD (MDa – MDb), a program memory MP (MPa – MPb) and logic liaison circuits (C1a, C2a, C3a, C4a; C1b, C2b, C3b, C4b).

Each control unit constitutes a self-contained equipment capable of dispatching all the traffic of the telephone installation. The equipments are duplicated for reliability reasons and each data memory MD constituting the inputs/outputs system additionally has access to the two MP sub-units, which is an additional reliability factor.

Figure 3:
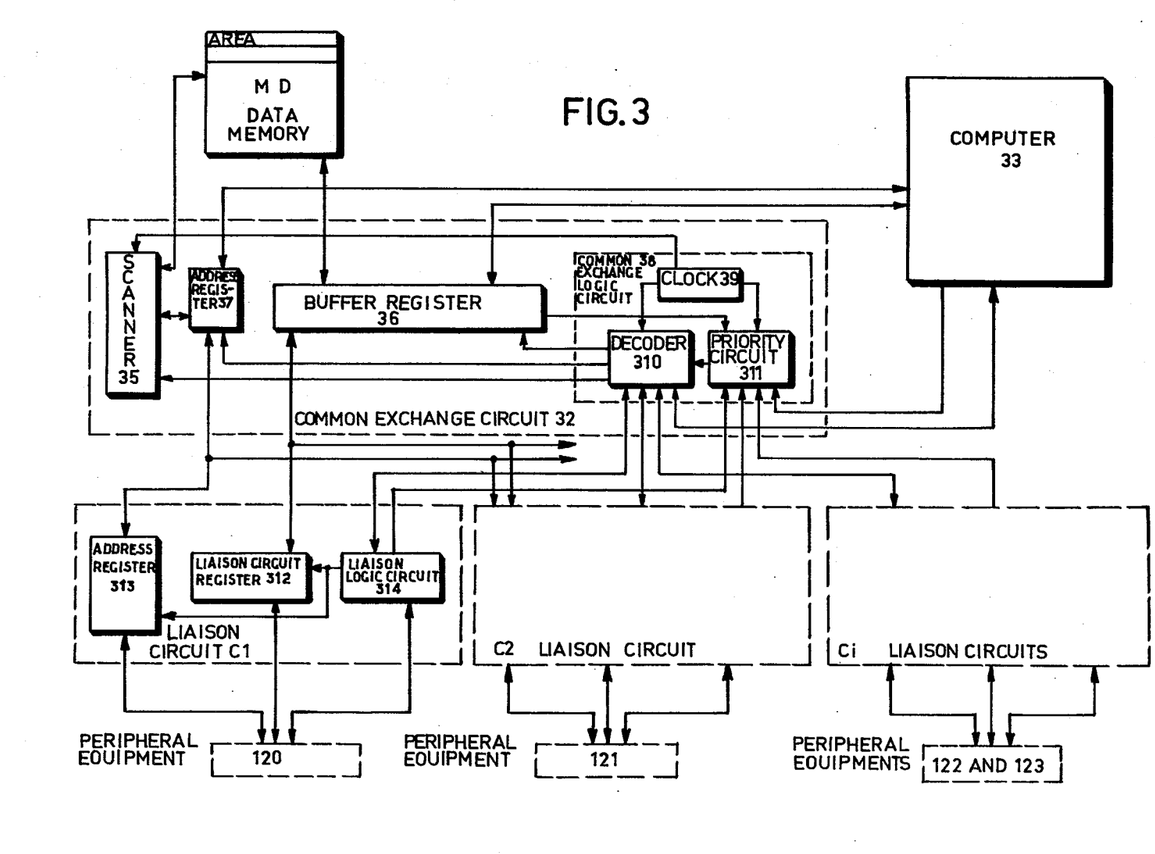
FIG. 3 is a block diagram of an example of a control unit according to the invention.

In a preferred exemplary embodiment, each control unit may be of the type described in the U.S. pending patent application No. 532,775. FIG. 3 shows one control unit of the common control equipment.

Said unit includes a data memory MD which is connected, via a common exchange circuit 32, first to a computer 33, and then to a number of liaison circuits C1 . . . Cn, themselves respectively connected to peripheral equipments 200, 210, 220, 230.

The common exchange circuit 32 sorts and checks the messages coming from the peripheral equipments 200, 210, 220, 230 and it writes them into the data memory MD.

Several messages read from a peripheral equipment via a liaison circuit and stored in the data memory are as follows: "The subscriber n°... has lift out", "There is a received digit", "The connection is established".

At the right time, the common exchange circuit 32 sends these processing orders to the computer which treats them, using the programs stored in its memory. The result of these treatments is orders created by the computer. These orders are temporarily stored in the data memory MD, and distributed towards the peripheral equipments 200, 210, 220, 230 by the common exchange circuit 32.

Several orders given to the peripheral equipments 200, 210, 220, 230 are as follows: "What is the state of the extension n°...?", "Release the extension n°...", "Connect the junctor n°... to the operator circuit n°...", "Find a free local junctor".

The data memory MD is connected to the peripheral equipments 200, 210, 220, 230 through respective liaison circuits C1 at Cn and through a common exchange circuit 32.

The data memory MD is a random access memory of any known type, such as for example a ferrite core memory or a semiconductor RAM. It is divided into several identical areas 34. Each area 34 is composed of several lines of memory MD and its capacity is sufficient to store all the informations to be known during the establishing of a call, such as for example the number of the dialling receiver used for said call, the number of calling party, the number of a peripheral equipment while it is connected to the logic arrangement, etc ...

An area 34 is associated to any call that is established by the telephone exchange during the time said call is being established. The computer 33 and all the peripheral equipments can read in it the informations they need for their operation, and write into it other informations that they will need later. When the calling party is connected to the called party, it is not necessary to keep these informations stored. So, the used area 34 is cancelled, all the bits therein are cleared. The area becomes free, and it can be chosen to be associated to another call.

The common exchange circuit 33 includes a scanner 35, a buffer register 36, an address register 37, and a common exchange logic circuit 38.

The scanner 35 is a binary counter. When it does not receive any order, it addresses the first line of each area 34 successively. Each time it addresses a line, the informations written in that line are transferred in the buffer register 36 and the address of the line is written in the address register 37. In a preferred embodiment of the invention, the condition (free or not) of each area 34 is written in the last bits of the first line of the corresponding area. So, the condition of the area 34 is transferred in the last bits of the buffer register 36. As soon as the informations are transferred from the first line of the area 34 to the buffer register 36, the common exchange logic circuit 38 reads the last bits of the buffer register 36. Thus, it knows the condition of the addressed area and it can choose the following operation to be done.

For example, if the condition of the area 34 is "area calling the computer for a process", the common exchange logic circuit 38 sends the computer 33 a signal informing it that it is needed. The computer 33 sends back a signal indicating whether it is free or not.

In a preferred embodiment of the invention, three wires connect the common exchange circuit 33 to computer 35.

On a first wire, a signal 1 or 0 occurs in dependence of the fact that the computer is busy or free.

On a second wire, a signal 1 or 0 occurs in dependence of the fact that the computer is faulty or not.

On a third wire, a signal 1 or 0 occurs in dependence of the fact that the operation processed by the computer is completed or not; when the operation is completed, the computer is calling.

If the computer 33 is not free, i.e. it is processing another call, the scanner 35 addresses the first line of the following area 34. However, if the computer is free, the bits in the buffer register 36 and the address register 37 are transferred into the computer 33, then the common exchange logic circuit 38 modifies the condition of the area 34. This condition becomes "area waiting for an answer from the computer". Then, the common exchange logic circuit 38 orders the scanner to address each line of this area successively. Each time a line is addressed, the bits therein are transferred into the buffer register 36 first, then into the computer 33. Thus, while it processes a call, the computer 33 has all the informations about the call at its disposal, stored in one of its own memories. Then, the scanner 35 addresses the first line of the following area 34, and its cycle goes on.

In a preferred embodiment of the invention, the area conditions are as follows:

"area calling the computer for a process ordered by an extension scanner (or by another peripheral equipment)", "area calling an auxiliary scanner (or another peripheral equipment) to send an order thereto";

"area waiting for an answer from the route tester n°... (or another peripheral equipment)", "area waiting for an answer from the computer", "area free", "faulty area".

The common exchange circuit 32 can receive only one message at a time, coming from a peripheral equipment. If several liaison circuits C1 - Cn simultaneously call the common exchange circuit 32, the latter must choose the call to be received. So, there are priority levels among the peripheral equipments. In a preferred embodiment of the invention, the auxiliary scanners have the highest priority, then the junctor scanners, the route testers and finally the extension scanners which have the lowest priority.

The common exchange logic circuit 38 included into a common exchange circuit 32 is a logic circuit which is designed in such a manner that it sends a signal to either the computer 33 or a determined liaison circuit C1 - Cn, according to the value of the binary elements received at the input of the common exchange logic circuit 38, said binary elements being the area condition of the concerned area 34. Moreover, the common exchange logic circuit 38 is designed to send orders, i.e. signals, to other elements 35, 36 and 37 of the common exchange circuit 32 when the computer 33, or a called liaison circuit C1 - Cn answers.

The common exchange logic circuit 38 includes a clock 39, a decoder 310, and a priority circuit 311.

The clock 39 synchronizes every part of the data memory MD and of the common exchange circuit 32 by sending clock signals to the scanner 35, the decoder 310, and the priority circuit 311.

If several devices simultaneously call the data memory MD, the priority circuit 311 selects the first call to be treated, according to a predetermined order. For example, one can select any call coming from the computer 33 and having a highest priority than any call coming from a liaison circuit C1 - Cn.

The decoder 310 includes a register, into which the area condition is transferred from the buffer register 36, and an electronic logic circuit. The electronic logic circuit is made of gates known per se, such as AND gates or OR gates. These gates are arranged so that the logic circuit sends validation signals to blocks 33, 35, 36, 37, C1 - Cn according to the signals (end of operation, admitted, free circuit . . . ) it receives from computer 33, buffer register 36, and liaison circuits C1 - Cn, and according to the area condition. A logic circuit, such as said common exchange logic circuit 38 can be easily made by those skilled in the art. It is not described in details since its circuit may be quite different according to data which depend on exchange characteristics for instance the number of liaison circuits, i.e. the number of types of peripheral equipments included in the exchange, or the number of the binary elements selected for writing the area condition, the code selected for defining said area condition, etc ...

The liaison circuit Ci includes a liaison circuit register 312, a register 313, and a liaison logic circuit 314.

The liaison circuit register 312 is connected to the buffer register 36 so that the bits written in the buffer register 36 can be transferred into the liaison circuit register 312, and vice-versa. This connection is multiplied on each liaison circuit register of each liaison circuit C1 - Cn, but only one liaison circuit at a time receives a validation signal from the common exchange circuit 32.

The validation signal is transmitted by the area condition register 310 included in the common exchange logic circuit 38. It is received by the liaison logic circuit 314 which controls the liaison circuit register 312. In such a manner, transferring information is possible between the buffer register 36 and the liaison circuit register 312 with only one liaison circuit at a time.

In the same manner, the address register 313 is connected to the address register 37 of the common exchange circuit, so that an address written in one address register can be transferred into the other address register. This connection is multiplied on each address register of each liaison circuit C1 - Cn, but transferring an address is possible between the address register 37 and the address register 313 with only one liaison circuit at a time, since the liaison logic circuit 314 also controls the address register 313.

All the peripheral equipments of a same type 200, 210, 220 or 230 called Pil - Pik are connected to the same liaison circuit Ci. For example, all the extension scanners are connected to the same liaison circuit, so that only one liaison circuit is present for all the extension scanners.

The liaison circuit register 312 and the address register 313 are connected to corresponding registers included in the peripheral equipments Pil - Pik. Thus it is possible to transfer an information from a line of the data memory 31 into a register of a peripheral equipment Pil - Pik via the buffer register 36 and the register 312 of the corresponding liaison circuit Ci, and vice-versa. The line of the data memory MD from which the information is transferred, or into which the information is written, respectively, is known. Its number is written into the address register 37, and is transferred into the address register of the peripheral equipment via the address register 313 of the liaison circuit.

One peripheral equipment processes only one communication at one time, corresponding to only one area. It stores the number of this area in one of its registers during the whole time it processes the communication. Thus, when it calls the data memory in order to send its informations at the end of the processing, it can send the number of the corresponding area and address the data memory.

When the same peripheral processes another communication, it will store another area number.

The liaison logic circuit 314 acts in a way similar to that of the common exchange logic circuit 38. It includes logic circuits to send validation signals to the liaison circuit register 312, to the address register 313, and either to one selected peripheral equipment Pij, when it receives a validation signal from the common exchange logic circuit 38, or to the common exchange logic circuit 38, when it receives a call signal from a peripheral equipment Pil-Pik. Moreover, it includes a priority circuit to select which call must be treated first, when it is simultaneously called by several peripheral equipments, and in some cases the common exchange logic circuit 38.

Figure 4:
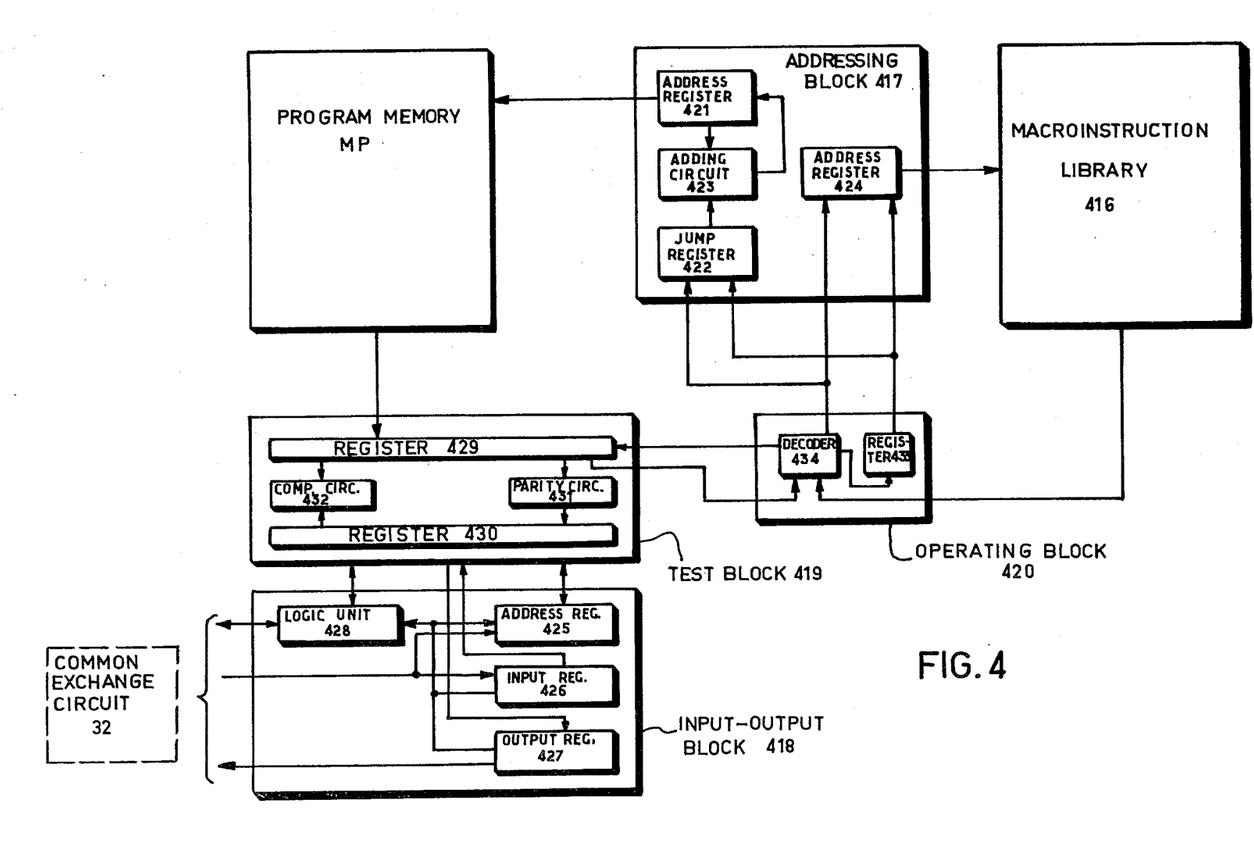
FIG. 4 shows the computer of a control unit of the FIG. 3.

Referring to FIG. 4, the computer 33 includes a program memory MP, a macroinstruction library 416, an adressing block 417, an input-output block 418, a test block 419, and an operating block 420. The program memory MP is connected to said common exchange circuit 32 through the test block 419 and through the input/output block 418.

The program memory MP is a random access memory of any known type, for example a ferrite core memory. It contains all the informations, programs and tables that are necessary for the running of the installation, and for carrying out the telephone procedures, especially those which depend on the facilities and are particular to each PABX.

The macroinstruction library 416 is either a random access memory, or a programmable read only memory, of any known type, for example a ferrite core random access memory or a semiconductor programmable read only memory. It contains subroutines, especially those which are the same in all the PABXs of this type.

The addressing block 417 comprises two parts: one for addressing the program memory MP, and the other for addressing the macroinstruction library 416.

The first part, which is intended to address the program memory 417, includes:

An address register 421 in which the address of the instruction to be executed is stored;

A jump register 422 in which is stored the number to be added to the contents of the address register 421 for obtaining the address of the following instruction to be executed, and, An adding circuit 423 which adds the contents of both the address register 421 and the jump register 422, and transmit the results to the address register 421.

The second part, which is intended to address the macroinstruction library 416, includes:

An address register 424 in which the address of the instruction to be executed is stored;

The information, whether program memory MP or macroinstruction library 416 is addressed, is stored in the operating block 420.

The input/output block 418 comprises an address register 425, an input register 426, an output register 427, and a logic unit 428. The computer 33 is connected to any other part of the logic arrangement according to the invention via this input/output block 418.

The input register 426 is an electronic register of any known type, with the same capacity as an area 34 of the data memory MD. When the computer 33 has to carry out a process concerning a communication, the informations, which are stored in the area 34 attributed to this communication, are transferred into the input register 426, via the buffer register 36 of the common exchange circuit 32. Previously, the address of this area 34 had been transferred from the address register 37 of the common exchange circuit 32 into the address register 425 of the input/output block 418.

Then the computer 33 carries out the process to be effected using the informations stored in the input register 426 of the input/output block 418. The way according to which a process is carried out will be described more in details later. The result of a process makes it necessary to write supplementary informations into the concerned area 34, and to modify informations that were previously inscribed therein. For that purpose, the computer 33 uses its output register 427.

The output register 427 is a register of the same type as the input register 426. It has the same capacity.

The computer 33 writes into its output register 427 the new informations, and the modified informations, at the place they must be written into the concerned area 34. The unchanged informations are directly transferred from the input register 426 into the output register 427. Thus, when the process is completed, the contents of the output register 427 is exactly the new contents of the concerned area 34.

The computer 33 then calls the common exchange circuit 32. The address of the concerned area 34, that remained in the address register 425 during the whole process, is transferred into the address register 37 of the common exchange circuit 32, and an order is fed to scanner 35 for addressing said area. Then the information are transferred from the output register 427 into the addressed area 34 concerned, via the buffer register 36.

Transferring informations from the common exchange circuit 32 into the input/output block 418, and vice-versa, is controlled by the logic unit 428 of block 418. The logic unit 428 comprises a clock and a priority circuit. The clock is a clock of any known type, which is controlled by the clock of the data memory that works with the computer 33, in order to run in synchronism therewith. It transmits sequential signals either towards the common exchange logic circuit 38, or towards registers of the input/output block 418, or towards the test block 419. For example, such signals are: Acknowledgement of a call from the common exchange circuit 32, actuation of the input register in order to make it possible to write (or to transfer) informations into (from) it, end of writing, actuation of a register of the test block 419 in order to make it possible to write into (to transfer from) its informations coming from (to be written into) a register of the input/output block 418, call of the common exchange circuit 32, ... The priority circuit is of any known type. It is needed when several common exchange circuits 32 are parallel mounted, each one being connected to a data memory MD, if in sme case 32 or more common exchange circuits 32 call the computer 33 simultaneously. The priority circuit selects the common exchange circuit 32 which must be answered first.

When the common exchange circuit 32 calls the computer 33, it sends a call signal to the logic unit 428. The clock of the logic unit 428 begins to run in synchronism with the clock of the common exchange logic circuit 38, then the logic unit 428 sends a signal to the common exchange logic circuit 38 in order to indicate to said circuit 38 that the computer 33 is free. Then informations can be transferred from the data memory MD to the input/output block 418, via the common exchange circuit 32. First, the address of the concerned area 34 is transferred from the address register 37 to the address register 425. The logic unit 428 sends validation signals to the address register 425 and to the test block 419, so that the address is transferred from the address register 425 to a register of the test block 419. In block 419, the parity of the address is checked, and the result is sent, as a signal, from test block 419 to the logic unit 428. If the parity is faulty, the transfer of informations is cancelled; if the parity is correct, the transfer of informations proceeds.

When the process is completed, the computer 33 calls the common exchange circuit 32, i.e. the logic unit 428 sends a signal towards the common exchange logic circuit 38. When the common exchange circuit 32 is free, its common exchange logic circuit 38 sends an acknowledgement signal to the logic unit 428. When receiving this signal, the logic unit 428 sends a validation signal to the address register 425, then to the output register 427, in order to have their contents transferred to the common exchange circuit 32.

The test circuit 419 includes two registers 429 and 430, a parity circuit 431 and a comparison circuit 432.

The register 429 and 430 have such a capacity that they can contain either a word of the program memory 415, or a word of the data memory MD. The register 429 is a shift register. Its shifts are controlled by subroutines stored in the macroinstruction library 416. Said subroutines are transferred from the macroinstruction library 416 into the operating block 420, where they are decoded to form shift order signals to be sent to register 429. Shifts in register 429 only occur when a part of the informations stored in the register 429 are needed, for example only a part of an instruction, if the contents of the register 429 are fed from the program memory MP or only a particular information, if the contents of the register 429 are fed from the input register 426.

The parity circuit 431 is of any known type. It determines the parity bit of a binary information stored in the register 429, and stores the parity bit into the register 430, while the contents of the register 429, except the parity bit, in transferred into the register 430. Thus, when the parity computing is completed, the information stored in the register 430 has an exact parity.

The comparison circuit 425 is of any known type. It compares the informations stored in the registers 429 and 430, and makes it possible to know whether their contents are identical or not.

In order to check the parity of an information, the information is stored into the register 429, its parity bit is computed in the parity circuit 431, in the manner described above, then the contents of the registers 429 and 430 are compared.

The operating block 420 includes a register 433 and a decoder 434. In the register 433 is stored the information as regards whether program memory MP, or macroinstruction library 416 is addressed. This information is stored into the register 433 by the decoder 434. The decoder 434 receives program instruction signals from the program memory 415 via the register 429, and subroutine signals from the macroinstruction library 416. The decoder 434 decodes these instructions and sends signals either to the register 429, or to the register 433 and to the jump register 422 or the address register 424, in order either to control shifts in the register 429, or to address the program memory 415 or the macroinstruction library 416.

The program memory MP and the macroinstruction 416 interact in the following manner. The program memory MP contains all the segmental programs to be executed in order to carry out a telephone procedure.

The macroinstruction library 416 includes subroutines which are selected from the programs recorded in the program memory MP. A type of instruction in the program memory MP is as follows:

"Call the macroinstruction number $n$".

Thus, while carrying out a program in the program memory MP, if this type of instruction appears, the program in the program memory MP is stopped, the $n^{th}$ subroutine is executed in the macroinstruction library 416, then the program in the program memory MP is continued from the following instruction.

The purpose of some subroutines is to arrange the informations in the data memory and in the program memory. For arranging the informations in the data memory, subroutines make the informations picked out of the input register 426 of the block 418, shifted in the register 429 of the test block 419, and placed at the right place in the output register 427 of block 418. Other subroutines make calculations in order to know the address of the instruction to be read in the program memory.

Concerning the peripheral equipments 120, 121, 122, 123, the FIG. 5a shows the constitution of an example of one module 200 in the subscriber monitoring equipment 120.

FIG. 5b shows the constitution of an example of one module 210 or 220 or 230 of the other peripheral equipments.

Figure 6:
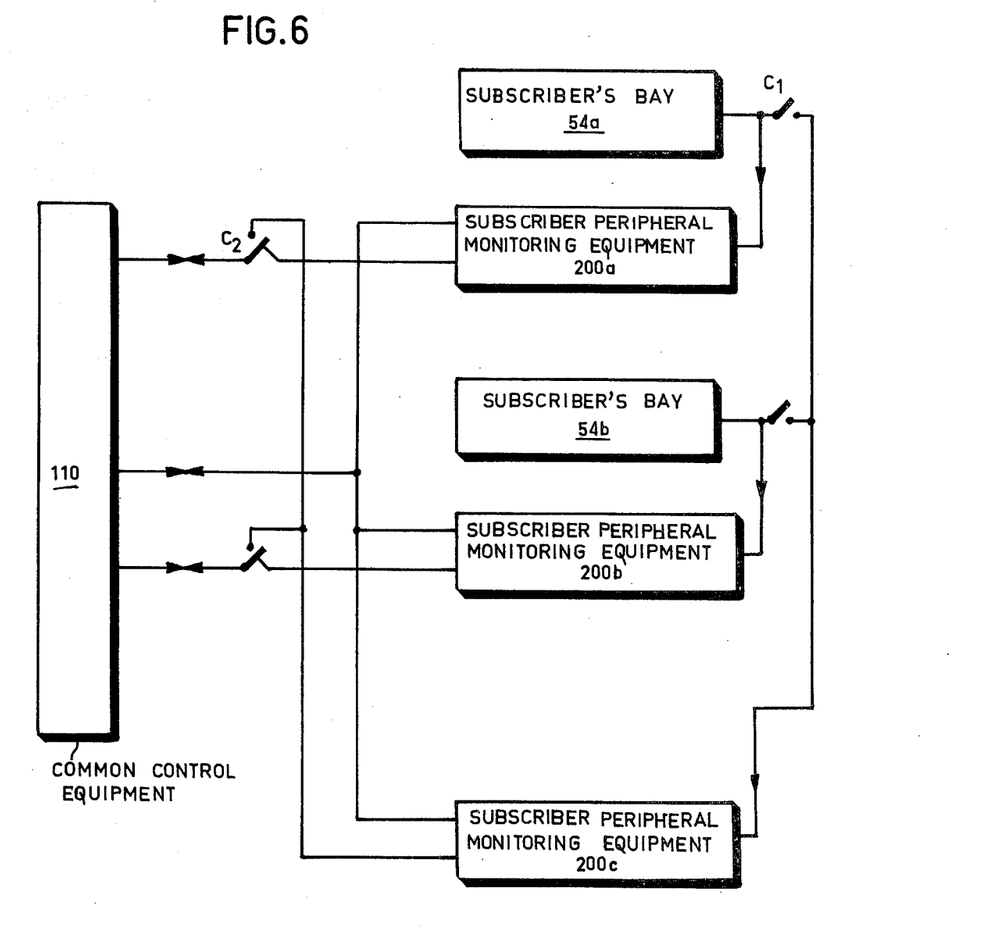
FIG. 6 shows how several peripheral modules are connected to the common control equipment.

An exchange may comprise a plurality of monitoring peripheral equipments of the kind described, with the module of FIG. 5a parallel-connected to a central computing unit, one of said equipments being possibly set aside as an emergency unit and the peripheral equipments as a whole having a common line which may be switched to the desired subscriber bays (see FIG. 6).

Said module 200 comprises as detailed in FIG. 5a:
a subscriber's line equipment monitoring device 53 connected to the subscriber's bay 54,
a memory unit 51,
a main register 59,
a memory scanner 52,
an internal logic unit 55,
a liaison circuit logic 57,
a liaison circuit register 58,
a comparison circuit 510.

All circuits 53, 51, 59, 52, 55, 57, 58, 510 are now disclosed as regards the circuits of a peripheral equipment, relay contact monitoring device 53 is connected to scanner 52, to subscriber bays 54 and to internal logic unit 55. It includes a multiplexer 531 of any convenient type and detectors 532 likewise of any convenient type.

Multiplexer receives, in respect of each subscriber, the states of the relay contacts of its line equipment, the relays being mounted inside subscriber bays 54, and at a given moment in time it transmits the states of all the contacts of a particular subscriber to detectors 532.

Detectors 532 associate with the state of each of said subscriber's contacts a logic level 1 or 0. These logic levels are transmitted to internal logic unit 55.

The function of the multiplexer is to select each subscriber in succession in order to treat the states of his contacts. To this end it receives a command from scanner 52 each time the latter addresses a line of memory 51.

The memory line corresponding to a subscriber is consequently read at the same time as the relay contacts of that same subscriber's equipment are monitored by the device 53.

Memory unit 51 is connected to scanner 52 and to main register 59. Memory 51 is a random-access live memory of any convenient type such as a ferrite-core or semiconductor memory. It is divided into zones, each of which contains all the information concerning a particular subscriber, such as his directory number, category and position. This notion is expounded in greater detail in the description of Internal Logic Unit 55.

The different memory zones are addressed by scanner 52.

The reading and writing operations are effected through the agency of main register 59.

The main register 59 is a register of known type, such as one constituted by electronic binary switches or flip-flops. It is connected to memory 51, to internal logic unit 55, to liaison circuit register 58 and to comparison circuit 510.

The structure of the main register is the same as that of each of the zones of memory unit 51 assigned to individual subscribers. It serves as the memory's input-/output element.

Scanner 52 is connected to contact monitoring device 53, to memory unit 51 and to liaison circuit register 58.

It is a scanner of any convenient type, such as a counter which cyclically addresses the different subscriber-allocated memory zones and, at the same time, the multiplexer 531 of contact monitoring device 53.

Scanner 52 may also be caused to intervene by the computer, when for instance the latter requires to know the informaton relating to a subscriber whose address in the memory it knows. Accordingly, the liaison circuit commands replacement of the address on which scanner 52 is positioned by the address which is written in the liaison circuit register, thereby momentarily interrupting the cycle of scanner 52, said cycle being resumed as soon as the call from the computer has been dealt with.

Internal logic unit 55 is connected to the contact monitoring device 53, to the main register and to the liaison circuit logic 57. It includes a coder 551, two registers 552 and 553, and a comparator 554.

Its function is to detect changes in the states of the relay contacts on subscriber line equipments and to generate information accordingly for the computer.

Coder 551 receives, in respect of each subscriber in succession the states of their respective relay contacts and encodes these states whereby to write in register 552 the monitored subscriber's position (e.g. resting, awaiting connection, connection, disconnection).

Simultaneously, the line corresponding to that same subscriber is read in memory unit 51 and transferred to main register 59. The subscriber position written into this register is transferred to register 553 of logic unit 55.

The contents of the two registers 552 and 553 are compared in comparator 554. If comparator 554 indicates that the contents of registers 552 and 553 are identical, then the subscriber's position will not have changed since the previous reading cycle on memory 51. Conversely, if the comparator indicates that the contents are different, then the subscriber's position will have changed and consequently the output signal from comparator 554 is applied to the liaison circuit logic whereby to initiate the computer call and to register 552 in order to transfer its contents, through the agency of main register 59, into memory 51 and into liaison circuit register 58.

The liaison circuit logic 57 is connected to the common control equipment 110, to internal logic unit 55, to liaison circuit register 58 and to comparison circuit 510.

It includes a priority circuit 571 and a decoder 572.

The function of liaison circuit logic 57 is to manage reciprocal exchanges between common control equipment 110 and a module 200 of subscriber exploring peripheral equipment 120.

Priority circuit 571, which may be of any convenient type, is wired so as to decide which of calls arriving simultaneously from common control equipment 110 and internal logic unit 55 must receive priority treatment. In cases where common control equipment 110 comprises a plurality of control units and the latter call peripheral equipment 120 simultaneously, priority circuit 571 also determines which of these calls must be given priority.

Decoder 572 receives signals from common control equipment 110, internal logic unit 55, priority circuit 571 and comparison circuit 510.

Depending on the signals present on the inputs to decoder 572, certain outputs will be validated whereby to emit appropriate signals either to common control equipment 110 or to liasion circuit register 58, such as:
a call to common control equipment 110,
an order to write into liasion circuit register 58, etc.

The circuit liaison register 58 is connected to liaison circuit logic 57, to common control equipment 110, to scanner 52, to main register 59 and to comparison circuit 510. It may be of any convenient type, consisting for example of electronic binary switches. It contains the information relating to a command received from, or to be sent to, the computer and the indications required to implement such command.

The comparison circuit 510 is connected to main register 59, to liaison circuit 58 and to liason circuit logic 57. It is a comparator of any convenient type, an example being an integrated comparator.

This comparator intervenes whenever common control equipment 110 must be given information relating to a subscriber whose directory number is written into liaison circuit register 58. The comparator thereupon receives upon its inputs the directory number written into 58 and the successive directory numbers that are written into main register 59 in the course of the memory scanning cycle. Each time the two directory numbers present upon the inputs coincide, a signal is sent to decoder 572.

FIG. 5b shows an example of a constitution of the other peripheral modules 210, 220, 230 of the peripheral equipments.

All equipments 120, 121, 122 and 123, described in reference to FIGS. 5a and 5b contain all the informations specific to the subscriber's lines or circuits. These modules monitor said circuits and then relieve the common control equipment 110 from the tasks of detection, analysis and intervention in dependence with the condition of the line equipments 132 or 133 and the circuits 135, 136 or 137. Certain other programs consist of logic elements with programs wired onto semi-conductor type read-only memories which are also a part of the modules referred to These peripheral equipments have the following multiple functions to perform:
monitoring and detecting changes of conditions in the circuits.
changing the condition of circuits in response to orders from the common control equipment 110,
generating the messages for the common control equipment subsequent to a local preprocessing, and
monitoring exchanges of information with the common control equipment.

FIG. 6 shows how several peripheral equipments 200a, 200b of the type 200 (associated respectively with subscriber's bays 54a, 54b, 54 in FIG. 5a) can be parallel connected with a third peripheral equipment 200c to the common control equipment 110 in order to increase the possibilities of an exchange.

The equipment (200c) may be set aside as an emergency unit to replace any of the other operative peripheral equipments if it should fail.

Transition to the emergency peripheral circuit is effected by an operator which energizes emergency peripheral equipment 200c and switches the contacts C1 and C2 by means of a push button.

Closing contact C1 causes subscriber's bay 54a to be connected to emergency peripheral equipment 200c. The tilting of contact C2 deletes the connections between the common control equipment and peripheral equipment 200a, and exchanges said connections for connections between the common control equipment and emergency peripheral equipment 200c.

The procedure for reverting to the previously failed peripheral equipment is as follows:
energize the previously failed peripheral equipment,
shut off the emergency peripheral equipment by actuating the above-mentioned button in the opposite direction.

Line equipments 132, 133 connection network 134, auxilliary circuit 137, connection circuits 135 or 136 are now described:

The line equipments are of any known type, e.g. including two relays.

As regards the connection circuits 135, 136, their function is to route the conversation, the various tones, the ringing signals and any other signals required to establish a connection between two subscribers.

They provide both local links and links with the exterior. Their role is a passive one and they are managed by peripheral equipment 123.

The connection circuits are formed by electronic components and two kinds of miniature or rod-type relays: the state relays controlled by the intervention circuits of peripheral equipment 123 and the line relays which reproduce external events independent of the peripheral's intervention, the contacts of which are monitored by contact monitoring device 53 of peripheral equipment 123.

The connection circuits are provided on plug-in printed-circuit modules.

The auxiliary circuits are connected to the connection circuits which they relieve of certain functions.

They are used momentarily until the voice link has been established on the connection circuit.

As well-known per se, the numbering auxiliary for example may be connected to a subscriber's set when the subscriber lifts the receiver. It energizes the set prior to establishment of the voice link, emission of tone signals or talking films and reception of the numbering pulses. The energizing means consist of a choke coil series-connected into each line wire. A relay operates when the auxiliary is connected to the telephone set. Two line relays, monitored by the logic for monitoring circuit 122, are respectively a relay for recording the dialling pulses and a relay for recording operation of the button (in cases where the set includes a control button).

The state relays enable switchings to be effected in the auxiliary. They are controlled by the intervention circuit of peripheral equipment 122.

Two relays serve to connect the state relays to the intervention circuit. One relay serves to apply the tone signals to the line wires.

The tone emitter is formed by an induction coil and a selection circuit.

The pulse emitter/tone detector auxiliary retransmits, externally of the automatic switching system, the numbering signals emitted by an internal set. It detects the various intermediate tone signals emitted from the exterior. It includes a pulse emitting relay controlled by the equipment 122 and the tone detector which is an electronic circuit that activates a relay when a signal of appropriate frequency and voltage is present at its inputs.

Other auxiliaries may be equipped for performing specific functions.

All the foregoing circuits are provided on printed-circuit cards for plugging into bays.

By way of example, and in order to detail the overall operation of the switching system, the description which follows will refer to the principal sequences entering into the procedure for establishing a local connection between a calling subscriber's line 130 and a called subscriber's line 131.

The line equipment 132 controls the change of condition of line 130, which changes to the "receiver lifted" condition. The peripheral equipment 120, which continuously scans the subscriber's line equipments, detects this change of condition and generates a message for the common control equipment 110 that embodies data relating to the "receiver lifted" condition, the directory number and the calling subscriber's category.

The message is processed by one of the two control units: it is received in a particular zone of the data memory, for instance in MDa of the first computer, via liaison circuit C1a. This zone characterizes the connection being established and is retained until it has been established.

The control unit analyses the message received and marks the condition "request for local preselection" in the memory zone in question. It then sends an order to peripheral equipment 122 instructing same to look for a dialling circuit matching the signalling code of the calling subscriber, characterized by his category (e.g. dialling on a dial or dialling on a multifrequency keyboard).

The equipment 122, which controls the auxiliary circuits, then operates by itself, selects a free dialing circuit and returns a message to the control unit to confirm the results and indicate the address number of the selected circuit (137 in this case) to said control unit.

During its exploration cycle the control units records a change in the condition of the memory zone, and is allowed to command the equipment 121 in order to connect line equipment 132 to circuit 137.

Equipment 121, which controls the connection circuit 34, then operates by itself: it selects a free local voice circuit 136 that can be connected via free link paths, through connection network 134, to both the circuit 137 and the line equipment 132 of calling subscriber 130. Equipment 121 returns a message to the control unit to confirm the result and indicate to said unit the address number of the selected voice circuit 136.

During its cycle the control unit notes a change of condition in the memory zone concerning this communication and, depending on the results and the category of the calling subscriber, may for example operate equipment 122 to initiate emission of the dialing tone in circuit 137.

The subscriber 130 then dials the directory number of the called subscriber 131, which may be different from the number of subscriber line equipment 133.

Operations on the dial or numbering keyboard of subscriber 130 are interpreted by the circuit 137. The equipment 122 which scans the circuits 137 re-establishes the dialling and transmits same in the form of commands sent digit by digit to the control unit, which records and analyses them as they are incoming. This analysis determines that the call is a local one, as is the case in this particular example.

Having recorded the directory number of subscriber 131 in the memory zone reserved for that call, the control unit interrogates the equipment 120, which monitors the subscriber line equipments, in order to ascertain the address of line equipment 133.

The equipment 120 then operates by itself and, when it finds the information in the modular sub-unit 210 controlling line equipment 133, it sends a message to the control unit, which message includes the category of subscriber 131.

During its cycle, the control unit notes a change of condition in the memory zone concerning this call and, if the categories of the two subscribers are compatible, it sends a command to equipment 121 asking for connection of the other branch of voice circuit 136 to line equipment 133 through the connection network 134.

Equipment 121 then operates by itself and, if it finds free links enabling the connection to be established, returns a confirmation message.

The control unit then sends a command to peripheral equipment 122 demanding release of dialling circuit 137, and a further command to peripheral equipment 123 to cause circuit 136 to switch to the condition for ringing subscriber 131.

The exchanges of information which take place within common control equipment 110 between the data memories and the program memories are described with reference to FIGS. 2, 3 and 4.

Establishment of a local call as described above involves the following operations:

5 operations of the equipment 120 for exploring the subscriber's lines, of which four are operations for exchanges of information and one for finding the called subscriber's number. The duration of an interchange between equipment 120 and common control equipment 110 is approximately 120 microseconds.

2 operations of routing test equipment 121.

9 operations of the equipment 122 for exploring circuits 137. An interchange of information between equipment 122 and common control equipment 110 last approximately 500 microseconds. 4 operations of the equipment 123 for exploring circuits 136. An interchange of information between equipment 123 and common control equipment 110 lasts approximately 100 microseconds.

30 calls upon operating sub-routines in common control equipment 110. Total time taken to execute these sub-routines is approximately 25 milliseconds.

Establishing a local call thus involves a total of twenty operations of equipments 120, 121, 122 and 123, which are special-purpose modules whose function is to perform operations which should normally be effected in common control equipment 110.

For certain functions, the above modules can thereafter operate at their own pace: in the case of equipment 120, for instance, operation in searching for the called subscriber's number lasts about 100 milliseconds; for equipment 121, the functions of testing and marking the paths through switching network 134 lasts about 60 milliseconds; for equipment 122, out of its nine operations two require a command for intervention on circuit 37 and each intervention lasts about 50 milliseconds; lastly, for equipment 123, each operation involves generating a command for intervention on circuit 136 the duration of which is about 50 milliseconds.

Common control equipment 110 in turn operates at its own pace. The data memory intervenes in the connection being established only when, during the process, it notes a change of condition in the memory zone assigned to that connection, this change being detected by comparison with the former condition.

Compared to the twenty operations of equipments 120, 121, 122 and 123 needed to establish a local connection, thirty operations are needed in addition to common control equipment 110. Each of these operations results in an interchange of information between the data memory in question and the corresonding program memory.

As many as possible of the functions are thus transferred to the decentralized modules from the common control equipment. The latter is used only for functions which cannot be performed in the peripheral equipments 120, 121, 122, 123.

This organization allows the use, in the common control equipment, of computers having memories with a relatively slow exploration cycle. In the example herein described, the cycle time of the memories used is only about 15 to 20 microseconds.

This definition in fact corresponds to the performance characteristics of ferrite core magnetic memories which, for the required memory capacities, or number of bits, are currently the least costly per bit.

A shorter cycle time would require more expensive memories which are also more costly to utilize because of the additional precautions which would have to be taken to ensure imperviousness to unwanted interference.

In addition, slow-cycle memories consume less current. It is accordingly unnecessary to provide forced ventilation means to dissipate the heat generated, which is a further factor in reducing the overall cost of the computer equipment and of the circuits utilizing such memories.

The use of slow-cycle memories is a teaching of this invention that runs counter to the current tendency in the program-controlled switching art to provide highly centralized memories with ever shorter exploration cycles and, ultimately, to resort to the still very costly semiconductor memories art.

The functions performed in peripheral equipments 120, 121, 122 and 123 are normally repetitive and, as a rule, use only wired-logic translation, functions or decision-making programs. The programming tasks are therefore eased and relate in the common control equipment 110 only to those processes which might change because of a change in operating mode or because of the addition of new services.

The exploration cycle of sub-units 200, 210, 220 and 230 of peripheral equipments 120, 121, 122 and 123, respectively, is adapted to both the frequency and rapidity of the changes of condition in the line equipments and circuits to be monitored by the respective peripheral equipments. Thus the exploration cycle on subscriber line equipment 132 or 133 by equipment 120 may be 20 ms, whereas that on circuits 137 by equipment 122 is 5 ms. By way of comparison the cycle time of the control units of common control equipment 110 is approximately 20 microseconds, These control units can operate at their own pace irrespective of the cycle times of the different peripheral equipments.

The relative independence of operation of equipments 120, 121, 122 and 123 and of the control unit of common control equipment 110 that centralize all the instructions in the operation routines makes it possible to simplify the programming through elimination of the possibility of interrupting program sequences in order to insert program sequences of higher priority, this being a further teaching of the present invention as well as a further advantage by comparison with prior art systems.

The system according to this invention accordingly allows the following functions to be realized: decentralizing of certain exploration, decision-making and control, generally contained in the common control device, thus transferring said functions to peripheral modular equipments having some autonomy but adapted to perform specialized functions (for which they are specifically programmed.

These functions are accordingly carried out on the basis of wired-program logic elements equipped in said modules, thus providing correspondingly reduced volume of the recorded-program memory in the common control device to only that part which is capable of being rapidly modified at low cost in order to meet any new requirements which may arise through a change in traffic or operating mode, the addition of a new service, etc...

It is thereby possible to obtain simpler operation of the common control device, which can be designed with less and easier-to-program equipment. The control unit does not require interruption programs in order to insert functions in dependence with a multiplicity of priority commands. All such specific processings are carried out in the special-purpose decentralized modules as a function of the cycle times imposed by the type of equipment or circuit these modules are equipped to monitor.

The control unit can thus operate at its own pace, and it consequently results that there is no determining factor in having control units provided with very short memory cycles. As it is well known, the cost of a control unit increases very rapidly as the cycle time decreases, and it is accordingly an advantage to use relatively slow, less costly control units having better protection against unwanted interference.

The test on available lattices is effected directly within the switching network, along with marking of the selected paths, through the agency of special-purpose peripheral equipments 121 independent from the common control equipment 110. The latter therefore saves the switching network imagestore equipment usually used in the highly centralized prior art systems for ascertaining available connection paths and which utilize complex and bulky routines in the central memory, it being additionally necessary for such routines to be complemented as and when the telephone installation is extended.

A system according to this invention thus provides the decentralizing of the main functions in the peripheral modular equipments, the number of which is proportional to the capacity of a given telephone switching system and increases with adapted stepwise extensions. The modularity of peripheral equipments 120, 121, 122 and 123 consisting of sub-units 200, 210, 220 and 230 respectively, enables the equipment of telephone exchanges to be exactly matched to the required capacity with respect to the number of lines and circuits.

It is thus possible to devise economical low-capacity installation which can be allowed to be extended by the addition of decentralized peripheral modules of the common control equipment, such additions being then possible with a minimum of interference with the commonpart. Extensions can be made without disturbing the installation in service, which is difficult to accomplish on installation with a highly centralized control system.

A system according to this invention accordingly facilitates and reduces the cost of modifications needed as the result of a change in installation operating conditions following a change in traffic, on operating mode, the addition of a new service, etc.

The combination of the above advantages ensures profitable utilization and first cost of the entire centralized control device with its recorded program and its various peripheral modules, in the case of a small telephone installation having a comparatively small number of lines and circuits and which could not economically justify the use of highly centralized control devices of the currently known kind.

If desired, the control unit used in accordance with this invention can be duplicated for reliability reasons, in which case the two control units would operate in a traffic-sharing mode. Further, the decentralization of major functions in modular peripheral equipments helps to increase overall reliability, since a malfunction on a peripheral equipment would mean that only a limited number of lines or circuits would be out of service. Moreover, certain peripheral equipment may be placed in reserve and used to back up any peripheral in the event of a malfunction or temporary failure thereof.

The decentralization of the functions thus contributes to reduce the cost of both equipment and software and to increase the overall reliability. The cost of extensions in terms of equipment, and through the addition of new services, is likewise reduced as a result.

It is accordingly possible to more easily manage a library of programs enabling the functions, operating modes and services appropriate to each customer to be determined. On the basis of standardized equipment, it then becomes possible to conceive and devise highly diversified switching systems to meet such different needs as those of private or public customers operating public telephone exchange networks, and this solely by introducing preestablished programs existing in the program library, selected according to requirements and which can be recorded in the memories of standard equipments by classic methods well-known in the art.

In the foregoing, consideration was given to the component parts of the telephone switching system and to the main functions entering into the establishment of a particular type of telephone communication.

Manifestly, there are other possibilities of establishing communications, which can be realized in installation offering operating modes or services that are either of the standard type or adapted to customer needs. These possibilities can be implemented by virtue of the decentralization feature in accordance with this invention.

It goes without saying that changes and substitution of parts may be made in the preferred non-limitative exemplary embodiment hereinbefore described, without departing from the scope of the invention as set forth in the appended claims.

We claim:

1. An improved electronic telephone switching system of the stored program type, connected to a trunk-telephone network, including first and second active stages and one passive stage each constituted by several elements, in which (a) said first active stage comprises a common control equipment responsible solely for information processing and formed by at least one control unit each comprising at least one program memory to allow an independent control of peripheral circuits in the second active stage and to receive information from them and an instruction library, and one data memory divided in distinct zones containing only temporarily the information required for the connections in the course of establishment and connected to said program memory, and by a plurality of liaison circuits connected to said data memory and comprising registers, in order that the control unit forms a self-contained equipment adapted to route all the traffic of the telephone installation by means of the programs recorded in the memory, (b) said second active stage comprises independent individual peripheral equipments each with at least a program, including scanning, decision-taking, control and marking means to cooperate with respect to said passive stage, each peripheral equipment serving as interface between said first active stage and independent elements of the said passive stage and each being formed at least by liaison circuits to realize the connection between the said peripheral equipments and the said liaison circuits in the said common control equipment and comprising a register and a priority logic to control the transfers between the peripheral equipment to which it belongs and each of said two other stages, by a monitoring device to survey the said elements of the passive stage, by storage means to receive the information necessary to survey the said elements, and by an internal logic unit which delivers a comparison signal to the priority logic of said liaison circuits in said peripheral equipment depending on the information from said storage means and said monitoring device, at least one peripheral equipment further including intervention circuits to control the working of said elements of the said passive stage, in order to provide to each peripheral equipment an autonomy in operation in respect of its own speciality since it calls upon said common control equipment only to obtain information it cannot itself provide, and to give to said equipment the information useful to the other peripheral equipment relative to the connection network, (c) said first active stage is linked to said passive stage through said second active stage which is directly connected to said passive stage, and (d) said passive stage comprises a conversion network including independent elements each respectively connected to one of said peripheral equipments in the second active stage, these elements being line equipments, one connection network, auxiliary circuits, local connection circuits, and connection circuits to connect said switching system to a trunk network, said line equipments, auxiliary circuits, local connection circuits and connection circuits to connect to the trunk network being connectable to each other through said connection network in order to effect the routing of the telephone traffic by means of the programs stored in the program memory.

2. An improved electronic telephone switching system as defined in claim 1, in which the said program in at least one of said independent individual peripheral equipments in said second active stage is determined by means of logic wired programmed circuit modules.

3. An improved electronic telephone switching system as defined in claim 1, in which the said program in at least one of said independent individual peripheral equipments in said second active stage is determined by means of at least a stored program.

4. An improved electronic telephone switching system as defined in claim 1, in which said storage means in at least one of said peripheral equipments in said second active stage includes at least a register to receive said information.

5. An improved electronic telephone switching system as defined in claim 1, in which said storage means in at least one of said peripheral equipments in said second active stage includes at least a memory to record said information and a main register to read it.

6. An improved electronic telephone switching system of the stored program type, connected to a trunk-telephone network, including first and second active stages and one passive stage each constituted by several elements, in which (a) said first active stage comprises a common control equipment responsible solely from information processing and formed by two identical control units each comprising at least one program memory to allow an independent control of peripheral circuits in the second active stage and to receive information from them and an instruction library and one data memory divided in distinct zones containing only temporarily the information required for the connections in the course of establishment and connected to said program memory, and by a plurality of liaison circuits connected to said data memory and comprising registers, in order that the control unit forms a self-contained equipment adapted to route all the traffic of the telephone installation by means of the programs recorded in the memory, the said two control units being connected to each other in a traffic sharing configuration, the program memory of the first control unit being connected to the data meemory of the second one, and the program memory of the second control unit being connected to the data memory of the first one, (b) said second active stage comprises independent individual peripheral equipment each with at least a program, including scanning, decision-taking, control and marking means to cooperate with respect to said passive stage, each peripheral equipment serving as interface between said first active stage and independent elements of the said passive stage and being formed at least by liaison circuits to realize the connection between the said peripheral equipments and the said liaison circuits in the said common control equipment and comprising a register and a priority logic to control the transfers between the peripheral equipment to which it belongs and each of said two other stages, by a monitoring device to survey the said elements of the passive stage, by storage means to receive the information necessary to survey the said elements and by an internal logic unit which delivers a comparison signal to the priority logic of said liaison circuits in said peripheral equipment depending on the information from said storage means and said monitoring device, at least one peripheral equipment further including intervention circuits to control the working of said elements of the said passive stage, in order to provide to each peripheral equipment an autonomy in operation in respect of its own speciality since it calls upon said common control equipment only to obtain information it cannot itself provide, and to give to said equipment the information useful to the other peripheral equipment relative to the connection network, (c) said first active stage is linked to said passive stage through said second active stage which is directly connected to said passive stage, each peripheral equipment being connected to one liaison circuit of the first control unit and to one liaison circuit of the second one for greater reliability, and (d) said passive stage comprises a conversion network including independent elements each respectively connected to one of said peripheral equipments in the second active stage, these elements being line equipments, one connection network, auxiliary circuits, local connection circuits, and connection circuits to connect said switching system to a trunk network said line equipments, auxiliary circuits, local connection circuits and connection circuits to connect to the trunk network being connectable to each other through said connection network in order to effect the routing of the telephone traffic by means of the programs stored in the program memory.

7. An improved electronic telephone switching system as defined in claim 6, in which the said program in at least one of said independent individual peripheral equipments in said second active stage is determined by means of logic wired programmed circuit modules.

8. An improved electronic telephone switching system as defined in claim 6, in which the said program in at least one of said independent individual peripheral equipments in said second active stage is determined by means of at least a stored program.

9. An improved electronic telephone switching system as defined in claim 6, in which said storage means in at least one of said peripheral equipments in said second active stage includes at least a register to receive said information.

10. An improved electronic telephone switching system as defined in claim 6, in which said storage means in at least one of said peripheral equipments in said second active stage includes at least a memory to record said information and a main register to read it.

11. An improved electronic telephone switching system of the stored program type, connected to a trunk telephone network, including first and second active stages and one passive stage each constituted by several elements, in which, (a) said first active stage comprises a common control equipment responsible solely for information processing and formed by at least one control unit each comprising a computer containing a program memory to allow an independent control of peripheral circuits in the second active stage and an instruction library, one data memory divided in distinct zones containing only temporarily the information required for the connections in the course of establishment, by a common exchange circuit connected on the one hand to the data memory and on the other hand to the computer, and by a plurality of liaison circuits connected to said common exchange circuit and comprising a logic and registers, in order that the control unit forms a self-contained equipment adapted to route all the traffic of the telephone installation by means of the programs recorded in the memory, (b) said second active stage comprises independent individual peripheral equipments each with at least a program, including scanning, decision-taking, control and marking means to cooperate with respect to said passive stage, each peripheral equipment serving as interface between said first active stage and independent elements of the said passive stage and each being formed at least by liaison circuits to realize the connection between the said peripheral equipments and the said liaison circuits in the said common control equipment and comprising a register, a priority logic and a decoder to control the transfers between the peripheral equipment to which it belongs and each of said two other stages, by a monitoring device having a multiplexer and detectors to survey the said elements of the passive stage, by a memory to store the information necessary to survey the said elements, by a main register serving as the memory's input/output device, by a scanner connected to the liaison circuit register, the monitoring device and the memory, by an internal logic unit which delivers a comparison signal to the priority logic of said liaison circuits in said peripheral equipment depending on the information from said memory through said monitoring device, and by a comparison circuit to compare numbers written in the main register and in the liaison circuit register, several peripheral equipments further including intervention circits to control the working of said elements of the said passive stage, in order to provide to each peripheral equipment an autonomy in operation in respect of its own speciality since it calls upon said common control equipment only to obtain information it canot itself provide, and to give to said equipment the information useful to the other peripheral equipments, as in the case relative to the connection network;

(c) the liaison circuits of the first active stage are connected to the liaison circuits of the second active stage, the monitoring device of the second active stage being connected to said passive stage; and (d) said passive stage is constituted by a conversation network including independent elements each respectively connected to one of said peripheral equipments in the second active stage, these elements being line equipments, one connection network, auxiliary circuits, local connection circuits, and connection circuits to connect said switching system to a trunk network, said line equipments, auxiliary circuits, local connection circuits, and connection circuits to connect to the trunk network being connectable to each other through said connection network in order to effect the routing of the telephone traffic by means of the programs stored in the program memory.

12. An improved electronic telephone switching system as defined in claim 11, in which the said program in at least one of said independent individual peripheral equipments in said second active stage is determined by means of logic wired programmed circuit modules.

13. An improved electronic telephone switching system as defined in claim 11, in which the said program in at least one of said independent individual peripheral equipments in said second active stage is determined by means of at least a stored program.

14. An improved electronic telephone switching system as claimed in claim 11, in which the first active stage comprises two computers connected in a traffic sharing configuration.

* * * * *